(12) United States Patent
Wada

(10) Patent No.: US 6,519,713 B1
(45) Date of Patent: Feb. 11, 2003

(54) MAGNETIC DISK DRIVE AND SCSI SYSTEM EMPLOYING THE SAME

(75) Inventor: Yoshikatsu Wada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/487,389

(22) Filed: Jan. 18, 2000

(30) Foreign Application Priority Data

Jan. 18, 1999 (JP) .............................. 11-008998

(51) Int. Cl.[7] ................................................ H02H 3/05
(52) U.S. Cl. ............................ 714/23; 714/43; 714/44
(58) Field of Search .......................... 714/23, 42, 43, 714/44, 5, 56

(56) References Cited

U.S. PATENT DOCUMENTS

| | | | |
|---|---|---|---|
| 5,611,078 A | * | 3/1997 | Miller et al. ................ 713/100 |
| 5,644,700 A | * | 7/1997 | Dickson et al. ................ 714/11 |
| 5,805,791 A | * | 9/1998 | Grossman et al. ............ 714/23 |
| 6,085,332 A | * | 7/2000 | El-Batal ........................ 710/1 |
| 6,192,481 B1 | * | 2/2001 | Deenadhayalan et al. ... 711/114 |

FOREIGN PATENT DOCUMENTS

| | | | |
|---|---|---|---|
| JP | 5-143483 | 6/1993 | ........... G06F/13/00 |
| JP | 7-84899 | 3/1995 | ........... G06F/13/00 |
| JP | 7-200420 | 8/1995 | ........... G06F/13/00 |

* cited by examiner

Primary Examiner—Robert Beausoleil
Assistant Examiner—Yolanda L. Wilson

(57) ABSTRACT

A magnetic disk drive permits control to a particular one of the magnetic disk medium among a plurality of magnetic disk media on a SCSI bus and does not influence the other magnetic media, and a SCSI system employing the same. The magnetic disk drive performing exchange of data between a plurality of magnetic disk media and an external circuit through a common SCSI bus, has a plurality of reset control circuits respectively connected to the plurality of magnetic disk media by individual SCSI buses connected to the common SCSI bus, and responsive to an externally applied command data directed to own circuit, for making a reset signal on a reset signal line of the individual SCSI bus connected to the own circuit active.

4 Claims, 3 Drawing Sheets

MAGNETIC DISK DRIVE AND SCSI SYSTEM EMPLOYING THE SAME

BACKGROUND OF THE INVENTION

1. Field of the Invention

The present invention relates generally to a magnetic disk drive and a SCSI system employing the same. More particularly, the invention relates to a magnetic disk drive and a SCSI system employing the same, in which a plurality of hard disks are connected to an electronic equipment, such as a computer or the like with a SCSI (Small Computer System Interface).

2. Description of the Related Art

A hard disk drive (HDD) has been becoming an essential component of computers for large storage capacity. Because of easiness of enhancing data transfer speed of the HDD and easiness of extension, connection of HDDs according to SCSI standard has been used frequently.

In general, when a plurality of HDDs are connected on a SCSI bus for operation in multiplexed manner, if failure is caused in one of the HDDs, such faulty HDD may occupy the SCSI bus. In such case, other HDDs operating normally cannot transit to next sequence unless occupied condition of the SCSI bus by the faulty HDD is released. Therefore, if data exchange with one HDD cannot be terminated successfully or normally, a reset signal on the SCSI bus is forcedly made active from an initiator side, to release the faulty HDD from occupying state of the SCSI bus. In this case, what controls a bus phase of the SCSI bus is the HDD of target side, releasing of occupying of SCSI bus by the particular HDD is achieved only by making the reset signal on the SCSI bus active. However, according to SCSI protocol, if the reset signal on the SCSI bus is made active, all of the on-going processes for other HDDs connected on the SCSI bus are also cleared. Accordingly, in order to perform data transfer for the cleared HDDS, set values have to be re-set, again.

However, by the conventional SCSI controller, when the reset signal on the SCSI bus is forcedly made active from the initiator side, reset condition is caused in other HDDs connected to the SCSI bus. If this condition is caused, the setting established for exchanging data with the initiator becomes null to require re-establishment of the setting from the beginning.

On the other hand, the HDD in execution of SCSI command from the initiator side interrupts the process. As a result, for making the reset signal active, retry processes for respective HDDs associating with SCSI protocol occur for many times to require a long period for exchanging data.

SUMMARY OF THE INVENTION

Accordingly, it is an object of the present invention to provide a magnetic disk drive which permits control particular one of magnetic disk medium among a plurality of magnetic disk media on a SCSI bus and does not influence for other magnetic media, and a SCSI system employing the same.

According to the first aspect of the present invention, a magnetic disk drive performing exchange of data between a plurality of magnetic disk media and an external circuit through a common SCSI bus, comprises:

a plurality of reset control circuits respectively connected to the plurality of magnetic disk media by individual SCSI buses connected to the common SCSI bus, and responsive to an externally applied command data directed to own circuit, for making a reset signal on a reset signal line of the individual SCSI bus connected to the own circuit active.

With the construction set forth above, the reset control circuit parses the command data from the external circuit, such as a host. If the command data is directed to the own circuit, the reset signal on the reset signal line of the individual SCSI bus connecting the reset control circuit and the magnetic disk medium is made active. By this, sequence can be interrupted by causing the reset condition on the magnetic disk medium connected to the reset control circuit and process of other magnetic disk media connected to the reset control circuit and the common SCSI bus will never be interfered.

In the construction set forth above, it is preferred that the reset signal control circuit comprises:

a command data parsing portion parsing the command data to make judgment whether the command data in question is directed to own circuit or not; and an execution processing portion making the reset signal on the reset signal line active for a given period when judgment is made that the command data is directed to own circuit as a result of parsing by the command data parsing portion.

According to the second aspect of the present invention, a SCSI system comprises:

a magnetic disk processing system serving as an initiator for performing exchange of data between a plurality of targets through a common SCSI bus; and a plurality of reset control circuits respectively connected to the plurality of magnetic disk media as targets by individual SCSI buses connected to the common SCSI bus, and responsive to an externally applied command data directed to own circuit, for making a reset signal on a reset signal line of the individual SCSI bus connected to the own circuit active, the reset control circuit making the reset signal on the reset signal line of the individual SCSI bus connected to the own circuit when the command data applied from the magnetic disk processing system is directed to the own circuit.

Similarly to the foregoing first aspect of the present invention, with the construction set forth above, the reset control circuit parses the command data from the external circuit, such as a host. If the command data is directed to the own circuit, the reset signal on the reset signal line of the individual SCSI bus connecting the reset control circuit and the magnetic disk medium is made active. By this, sequence can be interrupted by causing the reset condition on the magnetic disk medium connected to the reset control circuit and process of other magnetic disk media connected to the reset control circuit and the common SCSI bus will never be interfered.

Even in the foregoing constriction, it is preferred that the reset signal control circuit comprises:

a command data parsing portion parsing the command data to make judgment whether the command data in question is directed to own circuit or not; and an execution processing portion making the reset signal on the reset signal line active for a given period when judgment is made that the command data is directed to own circuit as a result of parsing by the command data parsing portion.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
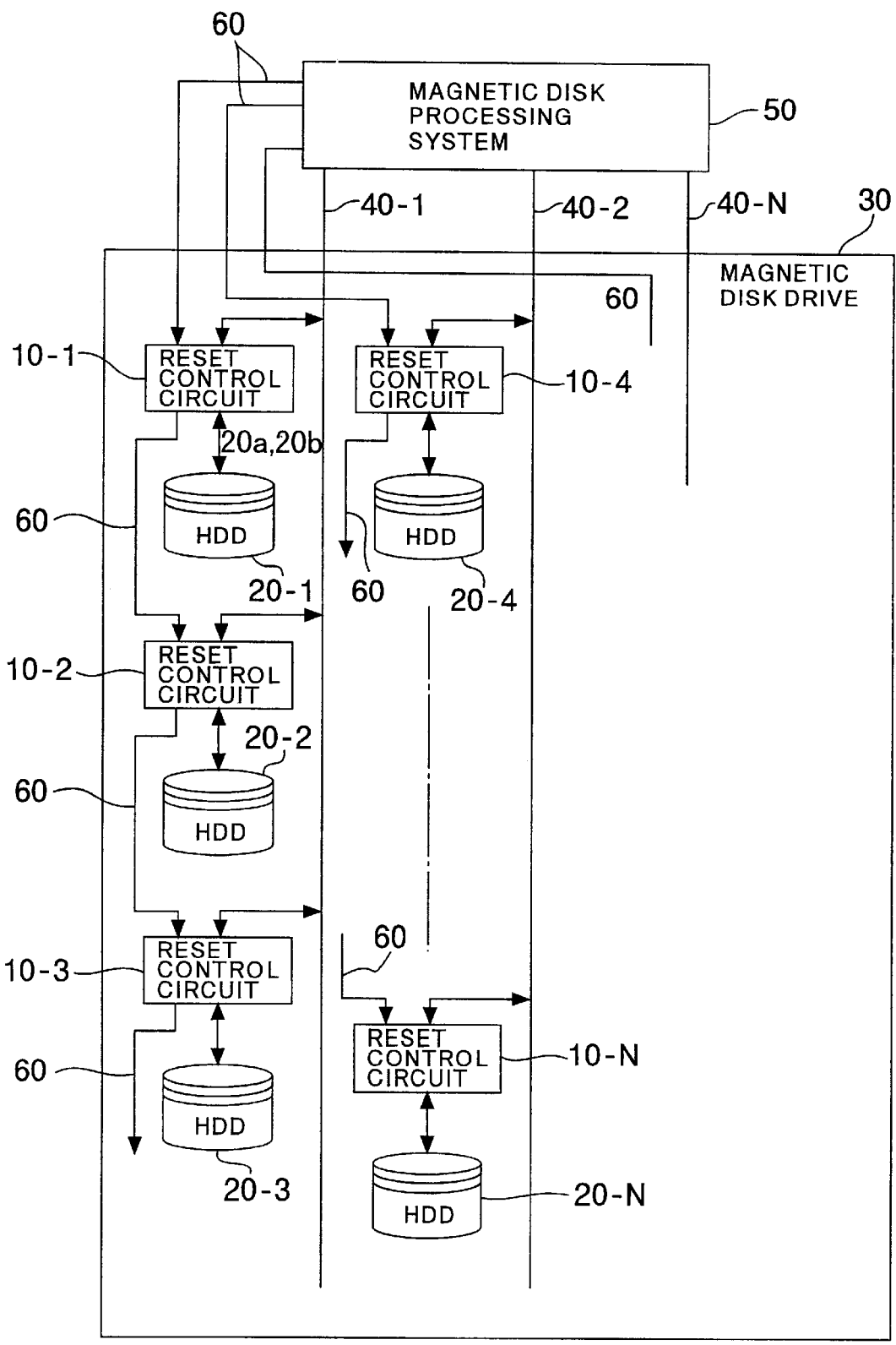
FIG. 1 is a connection chart showing a construction of a magnetic disk drive and a SCSI system employing the same in accordance with the present invention.

FIG. 1 shows a construction of the magnetic disk drive and a SCSI system employing the same in accordance with the present invention.

All of reset (RESET) control circuits 10-1, 10-2, . . . 10-N have identical specification and identical construction, which are connected to a plurality of hard disks 20-1 to 20-N as magnetic storage media in one-to-one basis. These reset control circuits 10-1 to 10-N and the hard disks 20-1 to 20-N are built-in a magnetic disk drive (HDD) 30. To the magnetic disk drive 30, a magnetic disk processing system 50 is connected via SCSI buses 40-1, 40-2, . . . 40-N. To each of the SCSI bus 40-1 to 40-N, at least one of hard disks 20 is connected via the reset control circuit 10. The magnetic disk processing system 50 and the reset control circuits 10-1 to 10-N are connected to a serial line 60.

The reset control circuit 10-1 to 10-N are responsive to a control signal from the magnetic disk processing system 50 via the serial line 60, for controlling a reset signal on the SCSI buses 40-1 to 40-N of the hard disks HDD20-1 to HDD20-N which are, in turn, connected to the SCSI buses 40-1 to 40-N. As set forth above, since the reset control circuit 10-1 to 10-N can be controlled from the magnetic disk processing system 50, a plurality of remaining hard disks will never be influenced even if the following failure is caused:

(1) when interface failure is caused while data exchange is performed with a certain hard disk;

(2) when the certain hard disk continues occupying of SCSI bus due to detection of data error or so forth; and (3) when time out is caused in the magnetic disk processing system 50.

Namely in the cases set forth above, it becomes possible to terminate sequence by terminating only process for the hard disk causing failure and causing a reset condition in an arbitrary hard disk by making a reset signal on the SCSI bus in active condition from the RESET control circuit for restoring the condition. Furthermore, process of other hard disk connected on the SCSI bus will never be interrupted.

Figure 2:
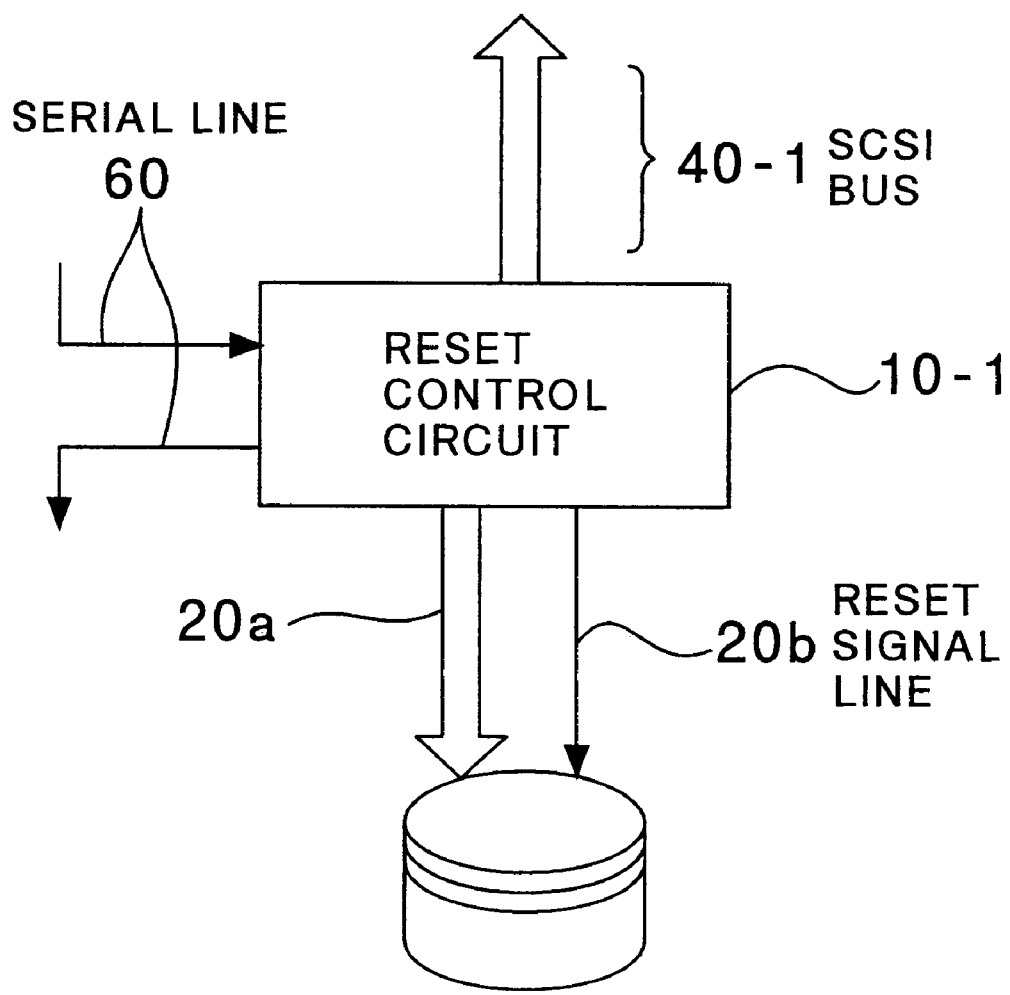
FIG. 2 is a circuit diagram showing a connection between a reset control circuit and an external circuit.

FIG. 2 shows a connection between the reset circuit and an external circuit. Here, only connection of the reset control circuit 10-1 will be illustrated. The reset control circuit 10-1 and the magnetic disk processing system 50 are connected to the SCSI bus 40-1 and the serial line 60. On the other hand, the hard disk 20-1 is connected to the SCSI bus 20a by a reset (RESET) signal line 20b. The reset signal line 20b is handled as one of signal lines in the SCSI bus 20a. On the other hand, the SCSI buses 40-1 to 40-N and the reset signal lines are not influenced with each other except for the reset signal line 20b.

Figure 3:
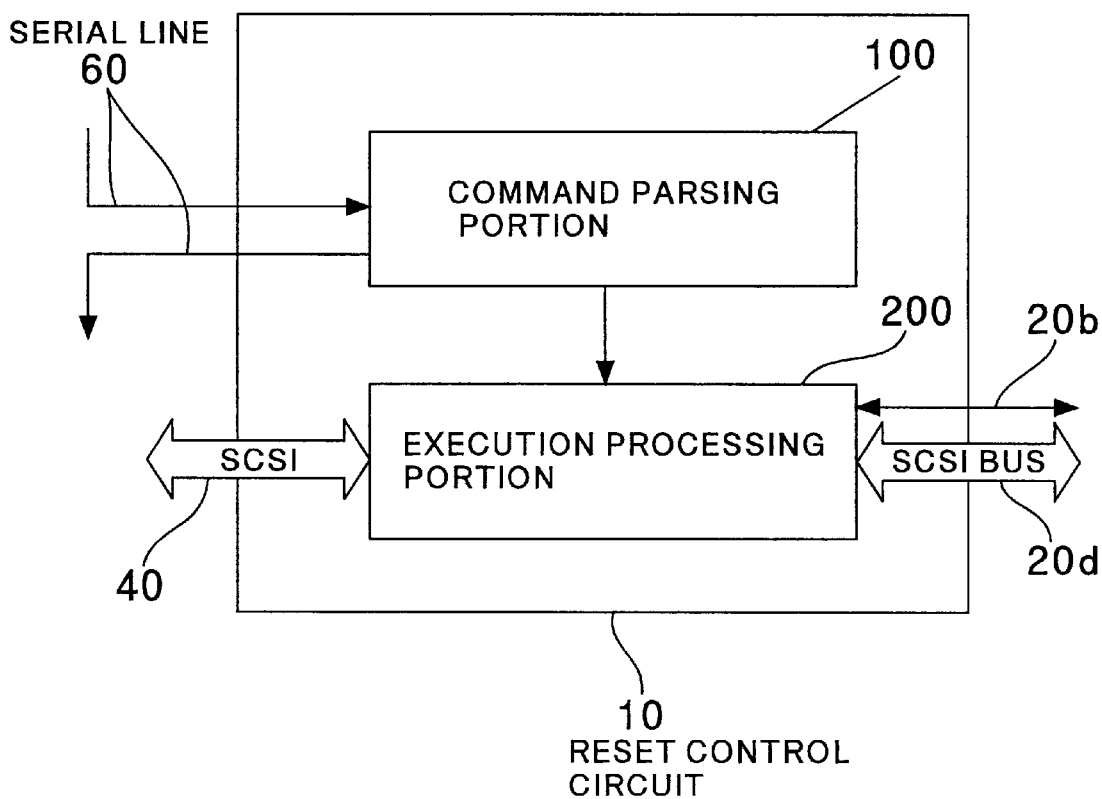
FIG. 3 is a block diagram showing a detailed construction of the reset control circuit according to the present invention.

FIG. 3 shows a detailed construction of the reset control circuit. The reset control circuit 10 includes a command data parsing portion 100 connected to the serial line 60 and an execution processing portion 200 connected to SCSI buses 40-1 to 40-N, 20a and the reset signal line 20b. The command data parsing portion 100 parses data from the serial line 60 to command execution of resetting for the execution processing portion 200 when judgment is made that data is directed to own reset control circuit. The execution processing portion 200 switches the reset signal on the reset signal line 20b included in the SCSI bus 20a between active state and inactive state.

Next, operation of the magnetic disk drive and the SCSI system employing the same according to the present invention will be explained with reference to FIGS. 1 and 3.

The magnetic disk processing system 50 performs data exchange between the hard disks 20-1 to 20-N in the magnetic disk drive 30 using known SCSI protocol and sequence. The magnetic disk processing system 50 multiplexes data exchange for the hard disks 20-1 to 20-N in the magnetic disk drive 30 using the protocol according to the SCSI standard. For example, during a sequence for exchanging data with the hard disk 20-1, if the magnetic disk processing system 50 wish to terminate the sequence with the hard disk 20-1, or when the hard disk 20-1 cannot continue the sequence on the SCSI bus 40-1, the magnetic disk processing system 50 as an initiator side equipment, transmits a command data for the reset control circuit 10-1 via the serial line 60. The reset control circuit 10-1 makes judgment that the command data is directed to the own reset control circuit to make the reset signal n the reset signal line 20b active by the execution processing portion 200. Then, after a given period, the reset signal becomes inactive. The hard disk 20-1 becomes reset condition according to the SCSI protocol to release occupying of the SCSI bus 40-1.

As set forth above, with the magnetic disk drive and the SCSI system employing the same according to the present invention, since the reset control circuit is provided for each of a plurality of hard disks in the magnetic disk drive and each of the reset control circuits is controlled by the command data, the reset signal on the SCSI bus connecting the reset circuit and the magnetic disk medium of the hard disk can be made active . Thus, the magnetic disk medium connected to the reset control circuit can be released from the SCSI bus which is common with other magnetic disk media. Namely, since the sequence can be terminated without interfering process of other magnetic disk media connected to the reset control circuits and the SCSI bus for external connection, the process can be continued.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A magnetic disk drive performing exchange of data between a plurality of magnetic disk media and an external circuit through a common SCSI bus, comprising:

a plurality of reset control circuits respectively connected to said plurality of magnetic disk media by individual SCSI buses connected to said common SCSI bus, and responsive to an externally applied command data directed to own circuit, for making a reset signal on a reset signal line of said individual SCSI bus connected to said own circuit active.

2. A magnetic disk drive as set forth in claim 1, wherein said reset signal control circuit comprises:

a command data parsing portion parsing said command data to make judgment whether the command data in question is directed to own circuit or not; and an execution processing portion making said reset signal on said reset signal line active for a given period when judgment is made that said command data is directed to own circuit as a result of parsing by said command data parsing portion.

3. A SCSI system comprising:

a magnetic disk processing system serving as an initiator for performing exchange of data between a plurality of targets through a common SCSI bus; and a plurality of reset control circuits respectively connected to said plurality of magnetic disk media as targets by individual SCSI buses connected to said common SCSI bus, and responsive to an externally applied command data directed to own circuit, for making a reset signal on a reset signal line of said individual SCSI bus connected to said own circuit active, said reset control circuit making said reset signal on said reset signal line of said individual SCSI bus connected to the own circuit when said command data applied from said magnetic disk processing system is directed to the own circuit.

4. A SCSI system as set forth in claim 1, wherein said reset signal control circuit comprises:

a command data parsing portion parsing said command data to make judgment whether the command data in question is directed to own circuit or not; and an execution processing portion making said reset signal on said reset signal line active for a given period when judgment is made that said command data is directed to own circuit as a result of parsing by said command data parsing portion.

* * * * *